United States Patent
Gordon

(10) Patent No.: US 9,699,605 B1
(45) Date of Patent: *Jul. 4, 2017

(54) MEASUREMENT OF REFERENCE SIGNALS WITH REDUCED INTERFERENCE

(71) Applicant: Polaris Wireless, Inc., Mountain View, CA (US)

(72) Inventor: Scot Douglas Gordon, Redmond, WA (US)

(73) Assignee: Polaris Wireless, Inc., Mountain View, CA (US)

( * ) Notice: Subject to any disclaimer, the term of this patent is extended or adjusted under 35 U.S.C. 154(b) by 372 days.

This patent is subject to a terminal disclaimer.

(21) Appl. No.: 14/531,616

(22) Filed: Nov. 3, 2014

Related U.S. Application Data

(63) Continuation of application No. 13/533,144, filed on Jun. 26, 2012, now Pat. No. 8,891,393.

(51) Int. Cl.
*H04W 4/02* (2009.01)

(52) U.S. Cl.
CPC .......... *H04W 4/021* (2013.01); *H04W 4/028* (2013.01)

(58) Field of Classification Search
CPC .............................. H04W 4/021; H04W 4/028
USPC .................................................. 370/241, 252
See application file for complete search history.

(56) References Cited

U.S. PATENT DOCUMENTS

| | | | |
|---|---|---|---|
| 2008/0310386 A1* | 12/2008 | Venkatachalam | G01S 5/0215 370/345 |
| 2010/0172311 A1* | 7/2010 | Agrawal | H04L 5/0048 370/329 |
| 2011/0312316 A1 | 12/2011 | Baldemair et al. | |
| 2012/0033615 A1 | 2/2012 | Dai et al. | |
| 2012/0040687 A1 | 2/2012 | Siomina et al. | |
| 2012/0142373 A1 | 6/2012 | Kazmi et al. | |
| 2012/0157082 A1 | 6/2012 | Pedersen et al. | |
| 2012/0190373 A1 | 7/2012 | Tenny | |
| 2013/0235738 A1 | 9/2013 | Siomina et al. | |

OTHER PUBLICATIONS

"U.S. Appl. No. 13/533,144", "NonFinal Office Action", Apr. 24, 2014, Publisher: USPTO, Published in: US.

* cited by examiner

*Primary Examiner* — Obaidul Huq
(74) *Attorney, Agent, or Firm* — McGeary Cukor LLC

(57) ABSTRACT

A telecommunications system is disclosed comprising a wireless switching center and plurality of base stations that are configured to transmit positioning reference signals. The base stations transmit the positioning reference signals in positioning subframe time intervals. Meanwhile, the base stations also transmit cell-specific reference signals continuously, including during the positioning subframe time intervals. In order to ensure that the wireless terminal measures those cell-specific reference signals during periods of lower interference, the base station imposes a measurement restriction on the wireless terminal, in regard to when it may measure a signal. As a result of utilizing the measurement restriction in this way, in combination with the improved interference characteristics of the positioning reference signals themselves, the ability of the wireless terminal to detect the cell-specific reference signals of more distant cells is improved. The improved signal measurements are then made available to functionalities such as location estimation.

20 Claims, 8 Drawing Sheets

MEASUREMENT OF REFERENCE SIGNALS WITH REDUCED INTERFERENCE

CROSS-REFERENCE TO RELATED APPLICATION(S)

This application is a continuation of U.S. patent application Ser. No. 13/533,144, filed Jun. 26, 2012, which is incorporated herein by reference.

FIELD OF THE INVENTION

The present invention relates to telecommunications in general, and, more particularly, to a technique for obtaining measurements of reference signals with reduced interference transmitted by a telecommunication system.

BACKGROUND OF THE INVENTION

FIG. 1 depicts a diagram of the salient components of wireless telecommunications system 100 in accordance with the prior art. Wireless telecommunications system 100 comprises: wireless terminal 101, base stations 102-1, 102-2, and 102-3, wireless switching center 111, assistance server 112, location client 113, and Global Positioning System ("GPS") constellation 121. Wireless telecommunications system 100 provides wireless telecommunications service to all of geographic region 120, in well-known fashion.

The salient advantage of wireless telecommunications over wireline telecommunications is the mobility that is afforded to the users. On the other hand, the salient disadvantage of wireless telecommunications lies in that fact that because the user is mobile, an interested party might not be able to readily ascertain the location of the user.

Such interested parties might include both the user of the wireless terminal and remote parties. There are a variety of reasons why the user of a wireless terminal might be interested in knowing his or her location. For example, the user might be interested in telling a remote party where he or she is or might seek advice in navigation.

In addition, there are a variety of reasons why a remote party might be interested in knowing the location of the user. For example, the recipient of an E 9-1-1 emergency call from the wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and, in some cases, by GPS satellites.

Wireless terminal 101 reports measurements to telecommunications system 100, which measurements can then be used for location estimation purposes. Independent of location estimation, however, terminal 101 monitors the strength of signals transmitted by multiple neighboring base stations, such as base station 102-1 through 102-3, in order to ensure that the terminal is always communicating with the base station that provides the strongest signal. If, at some point, another base station is found to provide a stronger signal, the call that involves the user of terminal 101 might need to be handed over to the other base station. Terminal 101 can then ask the system to initiate a handover. This technique is known as a "mobile-assisted handover" (MAHO).

In addition to other signals that provide connectivity for the wireless terminals, each of base station 102-1 through 102-3 also transmits a signal that is designed to be relatively tolerant of interference. Such signals are known by various names such as "pilots" in systems that are based on code division multiple access (CDMA), or "cell-specific reference signals" (CRS) in systems that are based on $3^{rd}$ Generation Partnership Project (3GPP) Long-Term Evolution (LTE). These reference-type signals can achieve greater interference tolerance because they carry very little information, essentially carrying the identity of the originating cell only.

The cell-specific reference signals enhance the detectability of signals from neighboring cells and make MAHO possible.

SUMMARY OF THE INVENTION

There are system functionalities other than mobile-assisted handover (MAHO), such as some location estimation techniques, that benefit from the ability to accurately detect signals from neighboring cells and, specifically, from the ability to estimate parameters of such signals. The problem with relying solely on cell-specific reference signals for non-MAHO functionalities, however, is that these reference signals were designed for detection by a wireless terminal primarily when the signal is transmitted by the base station of the serving cell of the wireless terminal or by a base station of a cell that is adjacent to the serving cell. Consequently, cell-specific reference signals that are transmitted from base stations that are further away from the wireless terminal can be difficult to detect and, hence, often unreliable for use in at least some non-MAHO functionalities in the prior art. Location estimation that relies on measurements by a wireless terminal is one such functionality.

In addition to providing for the transmission of cell-specific reference signals, the Long-Term Evolution (LTE) standard also provides a capability for estimating the location of wireless terminals, based on a technique referred to as "observed time difference of arrival" (OTDOA). OTDOA requires relative timing measurements to be made by the terminal. To support this capability, LTE requires that each base station transmit, at regular intervals, a signal known as a "positioning reference signal" (PRS). A PRS is designed to enable precise estimation of its time of arrival when received by a wireless terminal. In a typical use of these signals, a wireless terminal compares propagation time differences of signals from multiple base stations to estimate its own location.

The present invention enables a wireless terminal to measure reference signals with improved interference characteristics over at least some techniques in the prior art. The present invention is based on the observation by its inventors that the positioning reference signals used in the LTE standard, though optimized for precise estimation of time of arrival, also happen to have good characteristics for interference mitigation. In other words, the interference caused by positioning reference signals is less than the interference caused by other signals in the LTE standard, and it is easier to mitigate by using well-known and commonly used interference-mitigation techniques.

In accordance with the illustrative embodiment of the present invention, a telecommunications system comprises a wireless switching center (WSC) and plurality of base stations that are configured to transmit positioning reference signals. The base stations transmit the positioning reference signals in positioning subframe time intervals. Meanwhile, the base stations also transmit cell-specific reference signals continuously, including during the positioning subframe time intervals. In order to ensure that the wireless terminal measures those cell-specific reference signals during periods of lower interference, the base station advantageously imposes a measurement restriction on the wireless terminal, in regard to when it may measure a signal. Such a measurement restriction mechanism is available in LTE, as the inventors have observed, although it was previously used for other applications. As an example, the measurement restriction capability was previously applied to supporting femtocells that were deployed in an area where an LTE-based cellular system provides macrocellular service in the same spectrum. To avoid disruption of the macrocellular system, the femtocells were directed to transmit minimal amounts of radio signal in certain designated time intervals known as "almost blank subframes" (ABS). The macrocellular system would direct wireless terminals to attempt to detect cell-specific reference signals only in the ABS time intervals. The advantage of doing so was that, during ABS intervals, interference from femtocells was minimized.

In contrast to the traditional application of the measurement restriction mechanism, such as for femtocell management, the base station of the illustrative embodiment directs the wireless terminal to detect the cell-specific reference signals only in the positioning subframe time intervals. As a result of utilizing the measurement restriction in this way, in combination with the improved interference characteristics of the positioning reference signals themselves, the ability of the wireless terminal to detect the cell-specific reference signals of more distant cells is advantageously improved. This has the added benefit of making available improved measurements to functionalities such as location estimation, thereby improving their performance as well.

In some embodiments, the base station also transmits a measurement directive to the wireless terminal, in order to explicitly command the terminal to measure the reference signals and to return the corresponding measurement results. In some embodiments, a location estimation system can command the base station to transmit the directive, or can use the measurement results in a location estimation procedure, or both.

Although the telecommunications system of the illustrative embodiment utilizes the 3GPP LTE set of standards, it will be clear to those skilled in the art, after reading this specification, how to make and use embodiments of the present invention in which other standards are utilized, in addition to or instead of LTE. Such standards include, but are not limited to, Universal Mobile Telecommunications System "UMTS", Global System Mobile "GSM," CDMA-2000, IS-136 TDMA, IS-95 CDMA, 3G Wideband CDMA, IEEE 802.11 WiFi, 802.16 WiMax, and Bluetooth. In such embodiments reference signals, in addition to or instead of cell-specific reference signals and positioning reference signals, may be used, as those who are skilled in the art will appreciate after reading this specification.

The telecommunications system of the illustrative embodiment features measurement of cell-specific reference signals during the positioning subframe time intervals, in order to improve location estimation performance. It will be clear, however, to those skilled in the art, after reading this specification, how to make and use embodiments of the present invention in order to improve the performance of other functionalities that utilize measurements made by a wireless terminal.

An illustrative embodiment of the present invention comprises: transmitting, by a base station, a measurement directive to a wireless terminal to measure one or more cell-specific reference signals, wherein a measurement restriction transmitted to the wireless terminal indicates designated time intervals of one or more positioning subframes in which positioning reference signals are transmitted by one or more base stations, and wherein the measurement restriction imposes a restriction on the wireless terminal to measure the one or more cell-specific reference signals coincident with the designated time intervals; and receiving, by the base station, a measurement result from the wireless terminal in response to the measurement directive being transmitted.

DETAILED DESCRIPTION

For the purposes of this specification, the following terms and their inflected forms are defined as follows:

The term "location" is defined as a one-dimensional point, a two-dimensional area, or a three-dimensional volume.

The term "cell-specific reference signal" (CRS) is defined in "$3^{rd}$ Generation Partnership Project; Technical Specification Group Radio Access Network; Evolved Universal Terrestrial Radio Access (E-UTRA); Physical Channels and Modulation (Release 9), V9.1.0 (2010-03)," incorporated herein by reference and referred to hereinafter as "3GPP TS 36.211." A cell-specific reference signal is analogous to a CDMA pilot signal. The cell-specific reference signal is transmitted from each physical antenna port at a base station and is used by a wireless terminal for demodulation and measurement purposes.

The term "positioning reference signal" (PRS) is also defined in 3GPP TS 36.211. It is made up of one or more downlink symbols in a time and frequency grid that are known to a signaling base station and a decoding wireless terminal. Although not limited in its application, PRS can be used for estimation of the position of a wireless terminal for localization services, having been specified initially for support of the observed time difference of arrival (OTDOA) method. The terms "position reference signal" and "positioning signal" are used interchangeably with the term "positioning reference signal." Positioning referencing signals are also referred to as "idle periods in the downlink (IPDL) reference signals or "enhanced IPDL (e-IPDL) reference signals."

The term "positioning subframe" is defined as the conveyance mechanism of a positioning reference signal.

Figure 1:
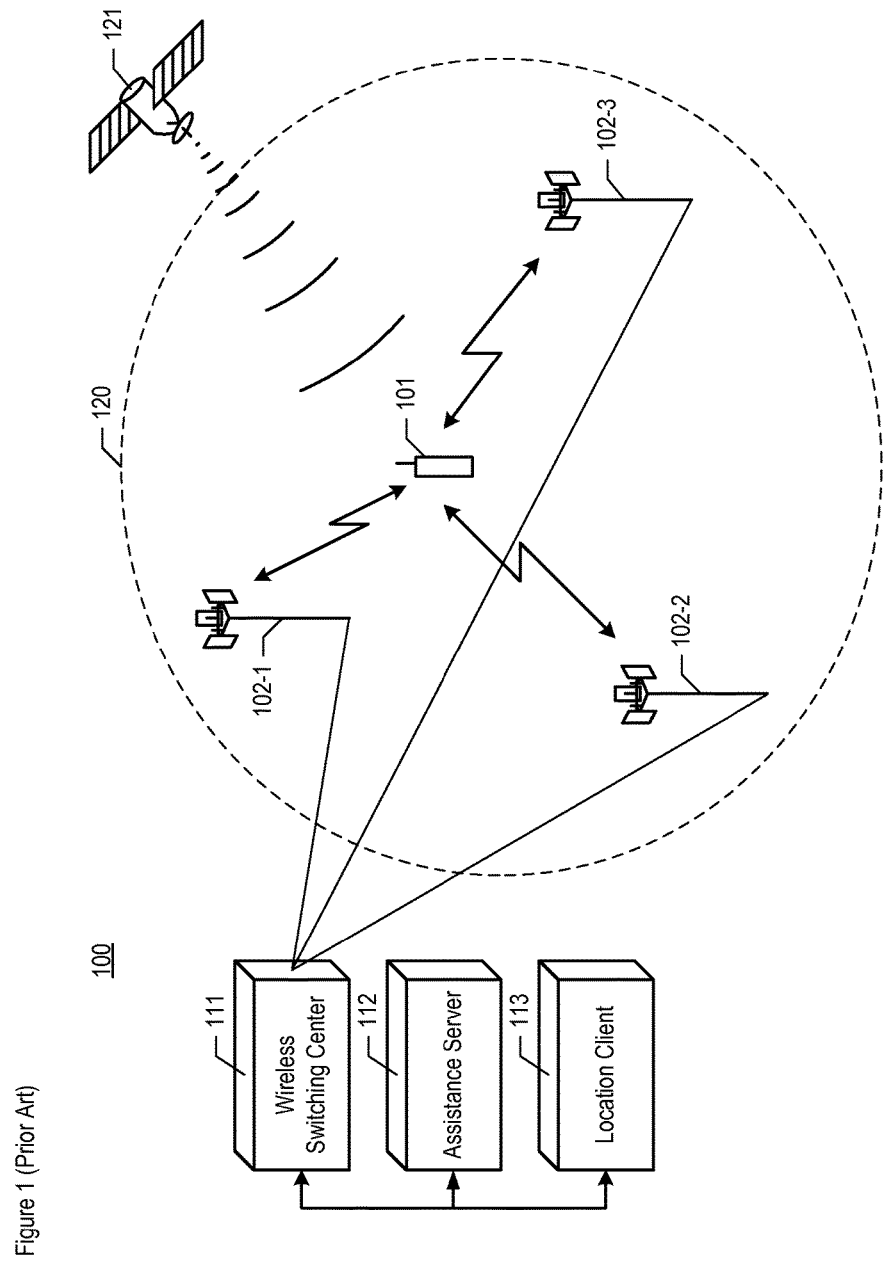
FIG. 1 depicts a diagram of the salient components of wireless telecommunications system 100 in accordance with the prior art.
Figure 2:
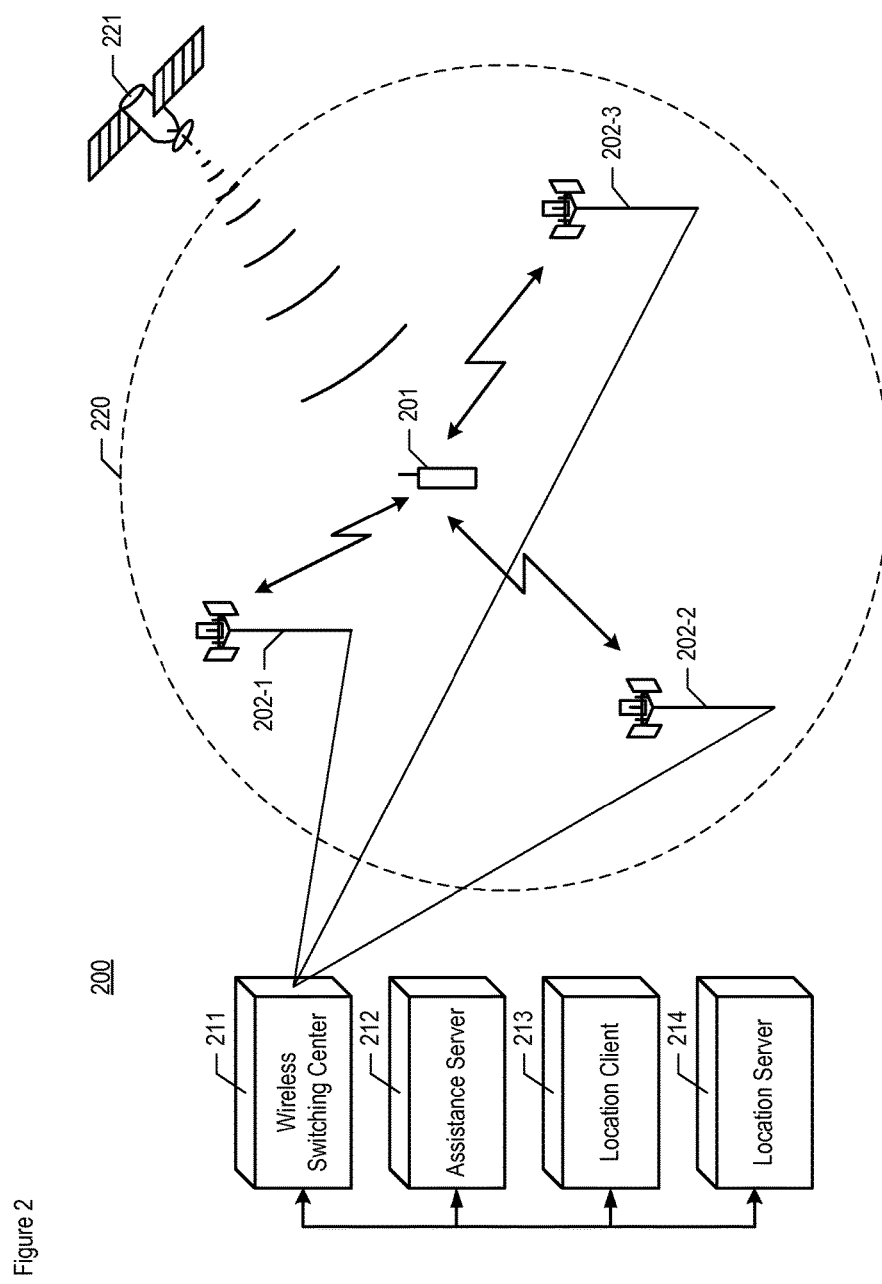
FIG. 2 depicts a diagram of the salient components of wireless telecommunications system 200 in accordance with the illustrative embodiment of the present invention.

FIG. 2 depicts a diagram of the salient components of wireless telecommunications system 200 in accordance with the illustrative embodiment of the present invention. Wireless telecommunications system 200 comprises: wireless terminal 201, base stations 202-1, 202-2, and 202-3, wireless switching center 211, assistance server 212, location client 213, location server 214, and GPS constellation 221, which are interrelated as shown. The illustrative embodiment provides wireless telecommunications service to all of geographic region 220, in well-known fashion, estimates the location of wireless terminal 201 within geographic region 220, and uses that estimate in a location-based application.

In accordance with the illustrative embodiment, wireless telecommunications service is provided to wireless terminal 201 in accordance with the Long Term Evolution set of standards, which is commonly known as "LTE." After reading this disclosure, however, it will be clear to those skilled in the art how to make and use alternative embodiments of the present invention that operate in accordance with one or more other air-interface standards (e.g., Universal Mobile Telecommunications System "UMTS", Global System Mobile "GSM," CDMA-2000, IS-136 TDMA, IS-95 CDMA, 3G Wideband CDMA, IEEE 802.11 WiFi, 802.16 WiMax, Bluetooth, etc.) in one or more frequency bands.

Wireless terminal 201 comprises the hardware and software necessary to be LTE-compliant and to perform the processes described below and in the accompanying figures. For example and without limitation, wireless terminal 201 is capable of:

i. measuring one or more traits of one of more electromagnetic signals and of reporting the measurements to location server 214, and ii. transmitting one or more signals and of reporting the transmission parameters of the signals to location server 214, and iii. receiving GPS assistance data from assistance server 212 to assist it in acquiring and processing GPS ranging signals.

As is well known to those skilled in the art, a wireless terminal is also commonly referred to by a variety of alternative names such as a wireless transmit/receive unit (WTRU), a user equipment (UE), a mobile station, a fixed or mobile subscriber unit, a pager, a cellular telephone, a personal digital assistant (PDA), a computer, or any other type of device capable of operating in a wireless environment.

Wireless terminal 201 is mobile and can be at any location within geographic region 220. Although wireless telecommunications system 200 as depicted comprises only one wireless terminal, it will be clear to those skilled in the art, after reading this disclosure, how to make and use alternative embodiments of the present invention that comprise any number of wireless terminals.

Base stations 202-1, 202-2, and 202-3 communicate with wireless switching center 211 and with wireless terminal 201 via radio in well-known fashion. As is well known to those skilled in the art, base stations are also commonly referred to by a variety of alternative names such as access points, nodes (e.g., Node-B, eNode-B, etc.), network interfaces, etc. Base stations 202-1, 202-2, and 202-3 also communicate with one another, in some embodiments. Direct interfaces between the base stations are not depicted; however, it will be clear to those skilled in the art, after reading this disclosure, how to make and use alternative embodiments of the present invention in which base stations communicate directly with each other, such as through an X2 interface as is known in the art.

Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, base stations 202-1, 202-2, and 202-3 are terrestrial, immobile, and within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

Wireless switching center 211 comprises a switch that orchestrates the provisioning of telecommunications service to wireless terminal 201 and the flow of information to and from location server 214, as described below and in the accompanying figures. As is well known to those skilled in the art, wireless switching centers are also commonly referred to by other names such as mobility management entities (MME), mobile switching centers, mobile telephone switching offices (MTSO), routers, etc.

Although the illustrative embodiment comprises one wireless switching center, it will be clear to those skilled in the art, after reading this disclosure, how to make and use alternative embodiments of the present invention that comprise any number of wireless switching centers.

In accordance with the illustrative embodiment, all of the base stations servicing wireless terminal 201 are associated with wireless switching center 211. It will be clear to those skilled in the art, after reading this disclosure, how to make and use alternative embodiments of the present invention in which any number of base stations are associated with any number of wireless switching centers.

Assistance server 212 comprises hardware and software that is capable of performing the processes described below and in the accompanying figures. In general, assistance server 212 generates GPS assistance data for wireless terminal 201 to aid wireless terminal 201 in acquiring and processing GPS ranging signals from GPS constellation 221. In accordance with the illustrative embodiment, assistance server 212 is a separate physical entity from location server 214; however, it will be clear to those skilled in the art, after reading this disclosure, how to make and use alternative embodiments of the present invention in which assistance server 212 and location server 214 share hardware, software, or both.

Location client 213 comprises hardware and software that use the estimate of the location of wireless terminal 201—provided by location server 214—in a location-based application, as described below and in the accompanying figures.

Location server 214 comprises hardware and software that generate one or more estimates of the location of wireless terminal 201 as described below and in the accompanying figures. It will be clear to those skilled in the art, after reading this disclosure, how to make and use location server 214. Furthermore, although location server 214 is depicted in FIG. 2 as physically distinct from wireless switching center 211, it will be clear to those skilled in the art, after reading this disclosure, how to make and use alternative embodiments of the present invention in which location server 214 is wholly or partially integrated with wireless switching center 211.

In accordance with the illustrative embodiment, location server 214 communicates with wireless switching center 211, assistance server 212, and location client 213 via a local area network; however it will be clear to those skilled in the art, after reading this disclosure, how to make and use alternative embodiments of the present invention in which location server 214 communicates with one or more of these entities via a different network such as, for example and without limitation, the Internet, the Public Switched Telephone Network (PSTN), etc.

In accordance with the illustrative embodiment, wireless switching center 211, assistance server 212, location client 213, and location server 214 are outside of geographic region 220. It will be clear to those skilled in the art, after reading this disclosure, how to make and use alternative embodiments of the present invention in which some or all of wireless switching center 211, assistance server 212, location client 213, and location server 214 are instead within geographic region 220.

Figure 3:
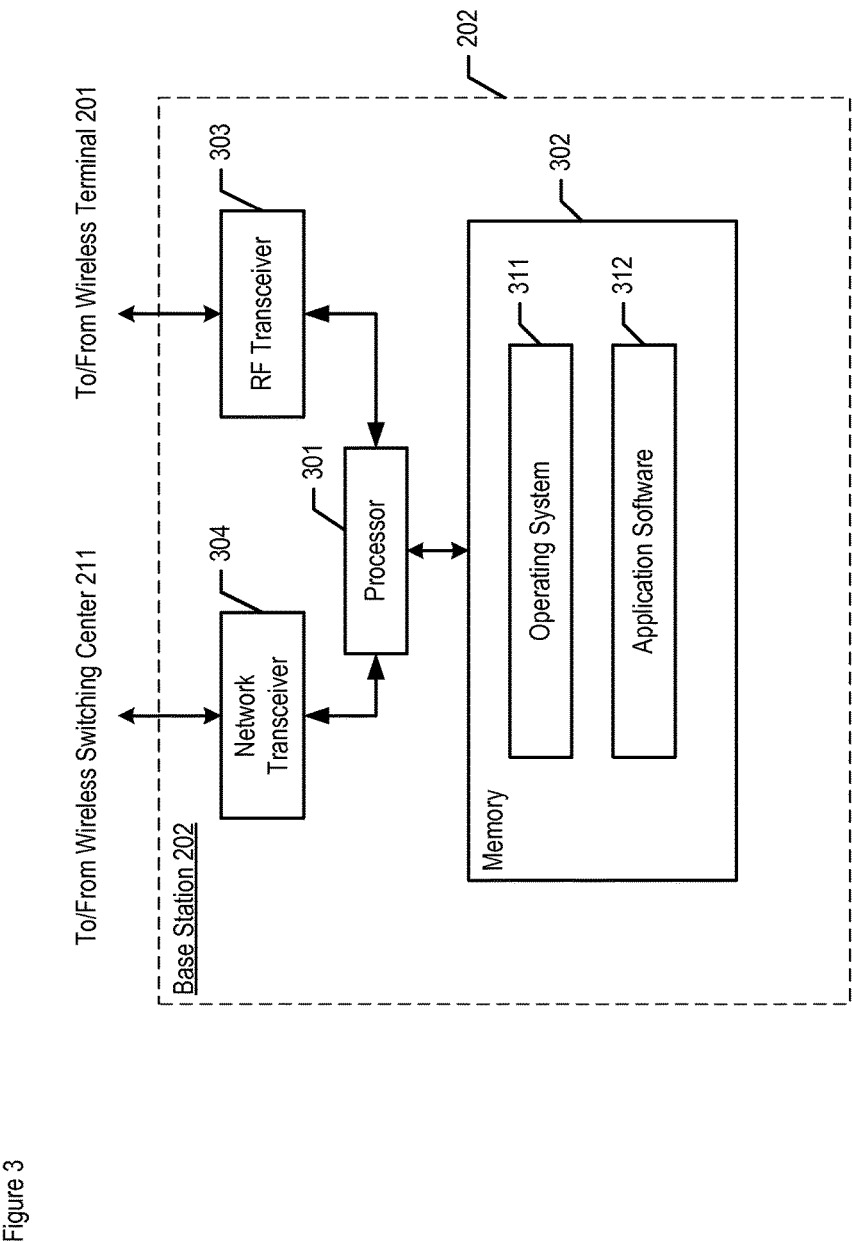
FIG. 3 depicts a block diagram of the salient components of base station 202, as shown in FIG. 2, in accordance with the illustrative embodiment.

FIG. 3 depicts a block diagram of the salient components of base station 202 (i.e., base station 202-1, 202-2, or 202-3) in accordance with the illustrative embodiment. Base station 202 comprises: processor 301, memory 302, radio-frequency (RF) transceiver 303, and network transceiver 304, which are interconnected as shown.

Processor 301 is a general-purpose processor that is capable of executing operating system 311 and application software 312, including the tasks described in detail below and in the accompanying figures. It will be clear to those skilled in the art how to make and use processor 301.

Memory 302 is a non-volatile memory that stores:
  i. operating system 311, and
  ii. application software 312.
It will be clear to those skilled in the art how to make and use memory 302.

RF transceiver 303 enables base station 202 to transmit and receive information to and from one or more wireless terminals, including wireless terminal 201. It will be clear to those skilled in the art how to make and use RF transceiver 303.

Network transceiver 304 enables base station 202 to transmit information to and receive information from location server 214 via wireless switching center 211. It will be clear to those skilled in the art how to make and use network transceiver 304.

Figure 4:
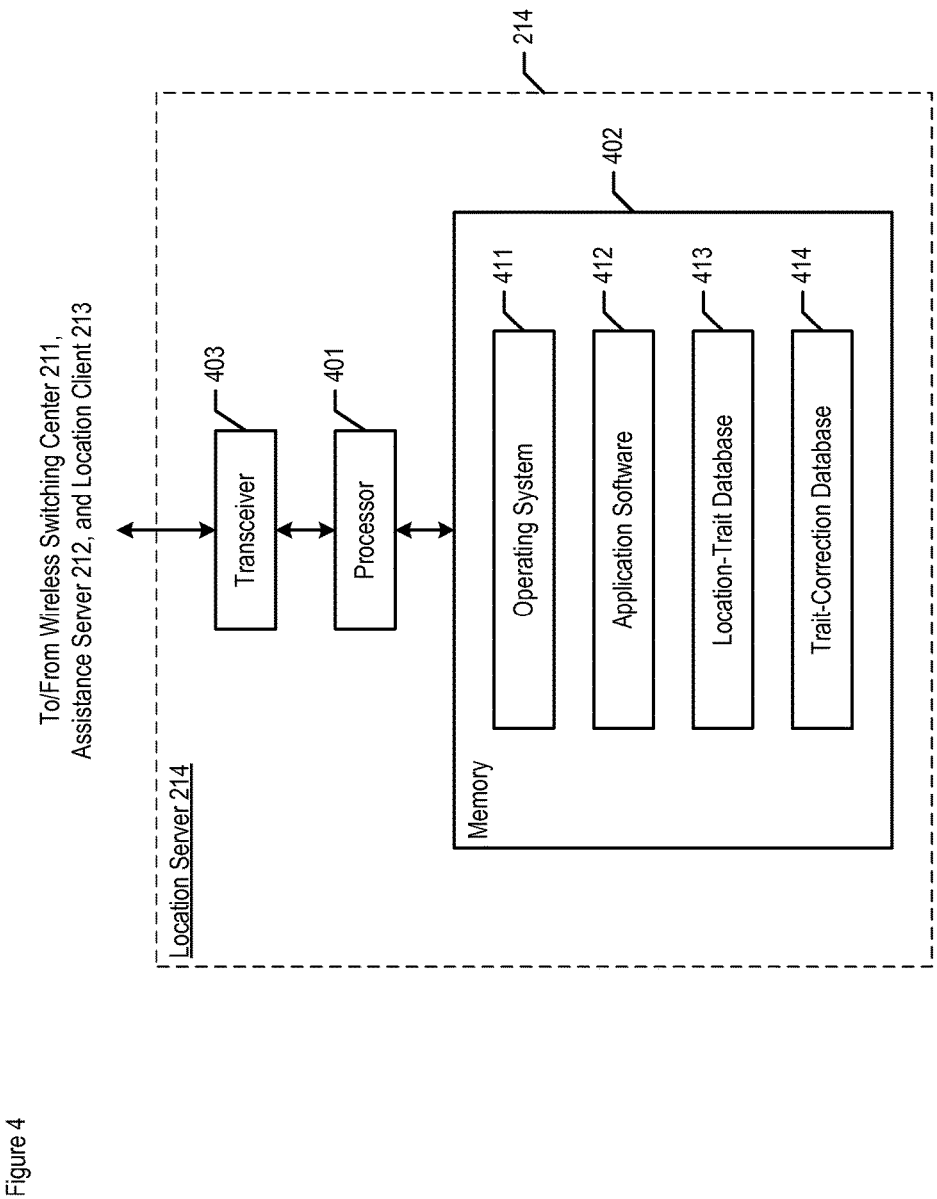
FIG. 4 depicts a block diagram of the salient components of location server 214, as shown in FIG. 2, in accordance with the illustrative embodiment.

FIG. 4 depicts a block diagram of the salient components of location server 214 in accordance with the illustrative embodiment. Location server 214 comprises: processor 401, memory 402, and local-area network transceiver 403, which are interconnected as shown.

Processor 401 is a general-purpose processor that is capable of executing operating system 411 and application software 412, and of populating, amending, using, and managing Location-Trait Database 413 and Trait-Correction Database 414, as described in detail below and in the accompanying figures. It will be clear to those skilled in the art how to make and use processor 401.

Memory 402 is a non-volatile memory that stores:
  i. operating system 411, and
  ii. application software 412, and
  iii. Location-Trait Database 413, and
  iv. Trait-Correction Database 414.
It will be clear to those skilled in the art how to make and use memory 402.

Transceiver 403 enables location server 214 to transmit and receive information to and from wireless switching center 211, assistance server 212, and location client 213. In addition, transceiver 403 enables location server 214 to transmit information to and receive information from wireless terminal 201 and base stations 202-1 through 202-3 via wireless switching center 211. It will be clear to those skilled in the art how to make and use transceiver 403.

Figure 5:
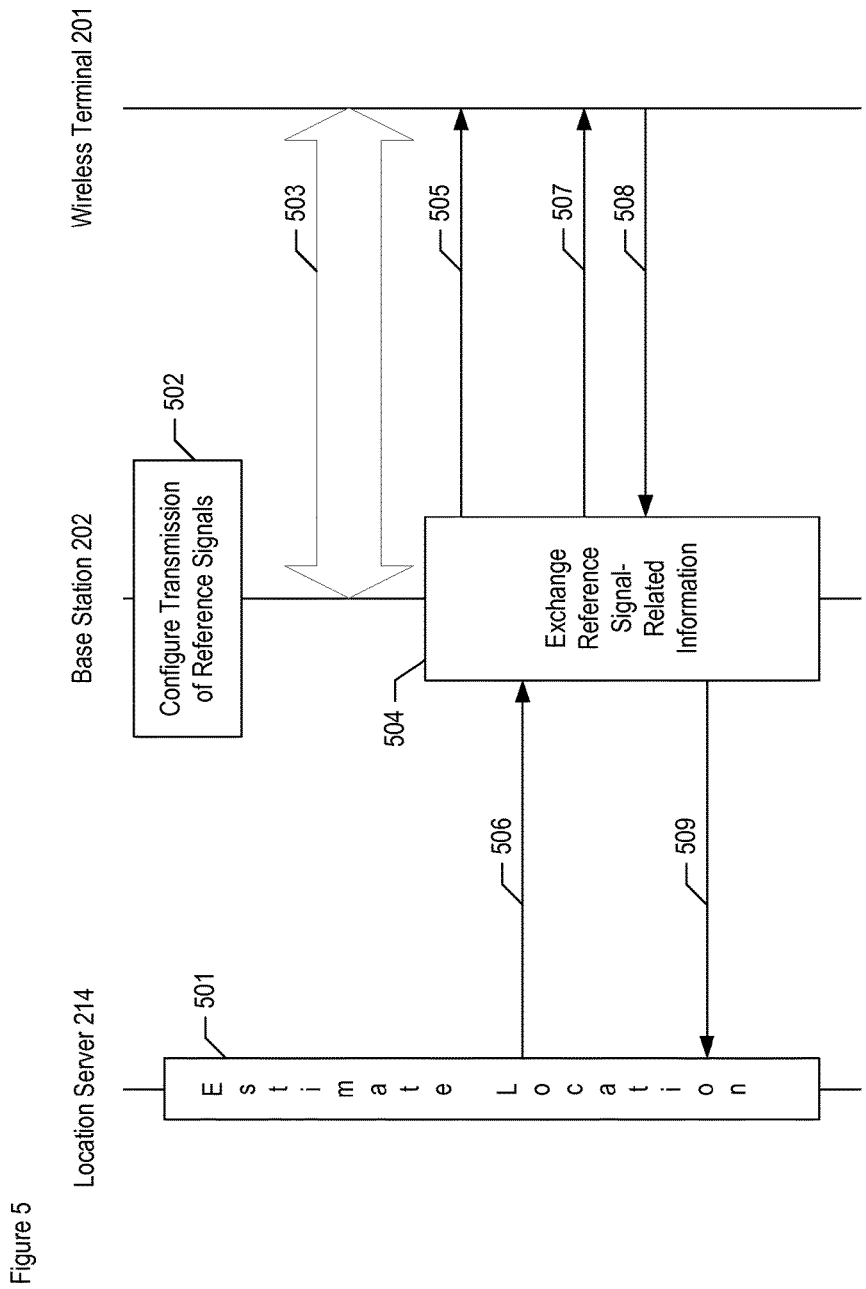
FIG. 5 depicts a flowchart of the salient processes performed in accordance with the illustrative embodiment of the present invention.

FIG. 5 depicts a flow diagram of the salient processes performed in accordance with the illustrative embodiment of the present invention.

In accordance with process 501, location server 214 performs location estimation on wireless terminal 201 on an on-going basis. The details of performing location estimation are described below and with respect to FIG. 6.

In accordance with process 502, base station 202 configures the transmission of reference signals, the details of which are described below and with respect to FIG. 7.

In accordance with process 503, wireless terminal 201 engages with base station 202 in a network access procedure, in well-known fashion. In some embodiments, terminal 201 performs an enhanced, random access channel (RACH) procedure, during which the terminal indicates its interference status or provides additional interference information to base station 202, or both, in order to improve interference coordination.

In accordance with process 504, base station 202 exchanges reference signal-related information with wireless terminal 201 on an on-going basis. Concurrently, location server 214 exchanges measurement-related messages with base station 202 (via wireless switching center 211). The details of performing these exchanges are described below and with respect to FIG. 8. In brief, base station 202 transmits measurement restriction 505 of the designated time intervals of one or more positioning subframes in which positioning reference signals are transmitted.

Asynchronously with respect to the transmission of measurement restriction 505, base station 202 receives measurement request 506 from location server 214 and, in response, transmits measurement directive 507 to terminal 201. Base station 202 is also capable of receiving measurement result 508 from terminal 201 and, in response, of transmitting measurement result 509 to server 214.

Figure 6:
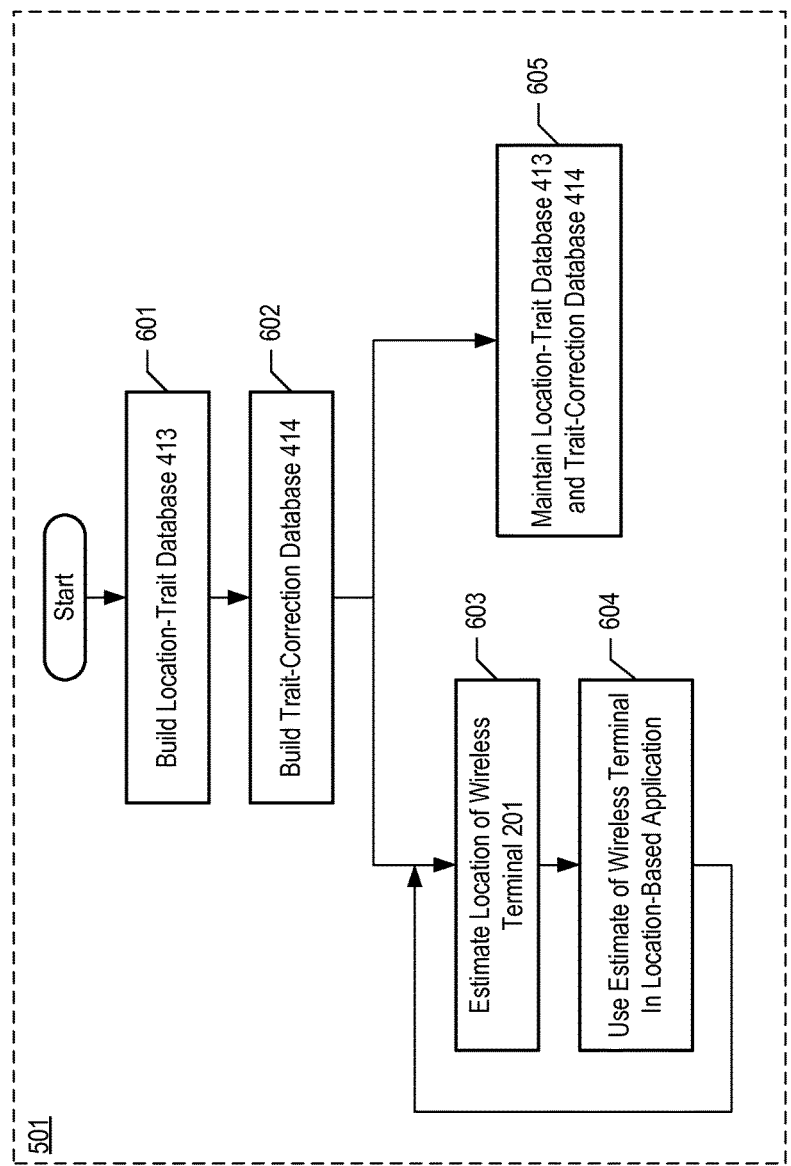
FIG. 6 depicts a flowchart of the salient sub-processes of process 501 as shown in FIG. 5, performed in accordance with the illustrative embodiment of the present invention.

FIG. 6 depicts a flowchart of the salient sub-processes of process 501, performed in accordance with the illustrative embodiment of the present invention. The flowchart provides an overview of a location estimation technique that uses measurements received from wireless terminal 201. The details of the illustrative location estimation technique are described in U.S. Pat. No. 7,257,414, which is incorporated herein by reference. Although FIG. 6 features a particular location estimation technique, it will be clear to those skilled in the art, after reading this specification, how to make and use embodiments of the present invention that interact with a different location estimation technique.

In accordance with process 601, location server 214 builds Location-Trait Database 413. For the purposes of this specification, the "Location-Trait Database" is defined as a database that maps each of a plurality of locations to one or more expected traits associated with a wireless terminal at that location.

In accordance with process 602, server 214 builds Trait-Correction Database 414. For the purposes of this specification, the "Trait-Correction Database" is defined as a database that indicates how the measurement of traits can be adjusted to compensate for systemic measurement errors.

In accordance with process 603, server 214 estimates the location of wireless terminal 201 based on location-trait database 413, trait-correction database 414, and a variety of traits that vary based on the location of wireless terminal 201. When needed, server 214 transmits measurement requests (e.g., request 506, etc.) to base station 202, in order to obtain a measurement result from wireless terminal 201. In some embodiments, in response to receiving a measurement result (e.g., result 509, etc.), server 214 uses the measurement result for generating an estimate of the location of wireless terminal 201.

In some embodiments server 214 uses the measurement result for any of a variety of location estimation techniques, in order to generate the location estimate. For example and without limitation, server 214 can generate the estimate by using—or refraining from using—pattern matching, assisted GPS, observed time difference of arrival (OTDOA) measurements, enhanced cell identifier (ECID) positioning, and so on.

In accordance with process 604, the estimate of the location of wireless terminal 201 is used in a location-based application, such as and without limitation, E 9-1-1 service.

In accordance with process 605, Location-Trait Database 413 and Trait-Correction Database 414 are maintained so that their contents are accurate, up-to-date and complete.

Figure 7:
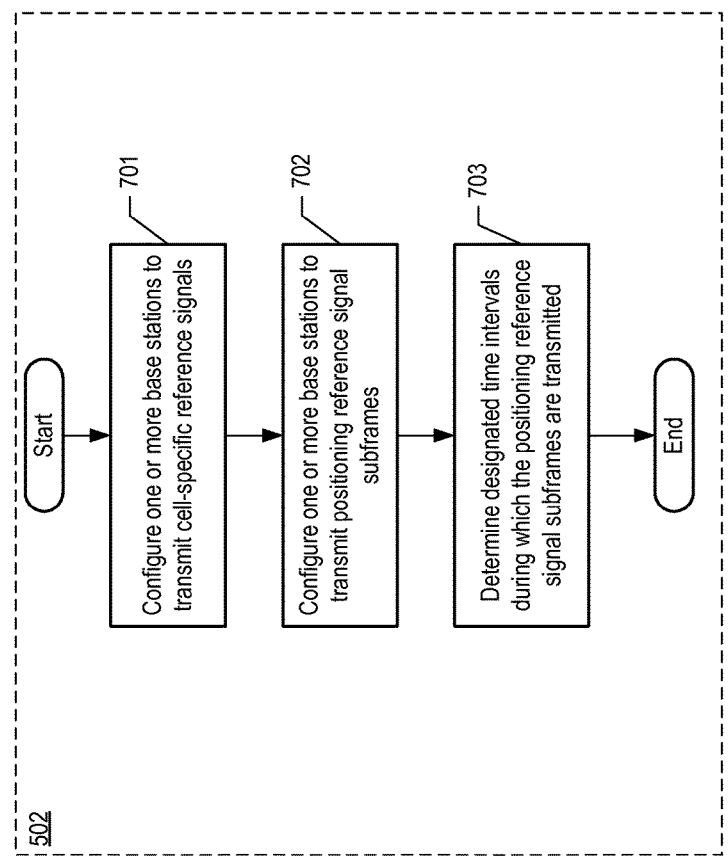
FIG. 7 depicts a flowchart of the salient sub-processes of process 502 as shown in FIG. 5, performed in accordance with the illustrative embodiment of the present invention.

FIG. 7 depicts a flowchart of the salient sub-processes of process 502, performed in accordance with the illustrative embodiment of the present invention. Although base station 202 performs the processes as described, it will be clear to those skilled in the art, after reading this disclosure, how to make and use alternative embodiments of the present invention in which wireless switching center 211 performs some or all of the processes.

In accordance with process 701, base station 202 configures one or more base stations to transmit cell-specific reference signals, in well-known fashion.

In accordance with process 702, base station 202 configures one or base stations to transmit positioning reference signals in positioning subframes, in well-known fashion. Base station 202 configures the base stations such that cell-specific reference signals are also transmitted during the time intervals in which the positioning subframes are transmitted.

In accordance with process 703, base station 202 determines the designated time intervals in which the positioning subframes are transmitted, in well-known fashion. In some embodiments, base station 202 also bases the designated time intervals on when almost blank subframes (ABS) are transmitted by one or more neighbor cells. For example and without limitation, a neighbor cell transmitting such subframes can be a femtocell, as discussed below and with respect to FIG. 8.

Figure 8:
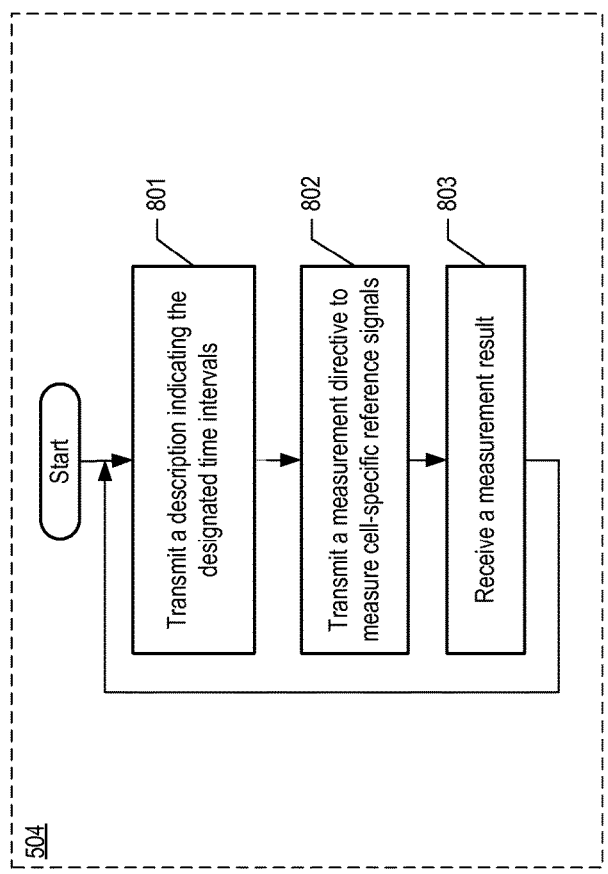
FIG. 8 depicts a flowchart of the salient sub-processes of process 504 as shown in FIG. 5, performed in accordance with the illustrative embodiment of the present invention.

FIG. 8 depicts a flowchart of the salient sub-processes of process 504, performed in accordance with the illustrative embodiment of the present invention.

In accordance with process 801, base station 202 transmits measurement restriction 505 to wireless terminal 201, which restriction indicates the designated time intervals ascertained at process 703. The transmitted measurement restriction imposes a restriction on the wireless terminal to measure one or more cell-specific reference signals coincident with the designated time intervals. This type of restriction is, in fact, referred to in the art as "measurement restriction."

In accordance with the illustrative embodiment, a measurement restriction indicates which of 40 subframes a wireless terminal can measure. In accordance with the LTE standard, 40 subframes span 40 milliseconds of time, but PRS subframes may be transmitted no more frequently than once every 160 milliseconds. Thus, base station 202 is able to specify to wireless terminal 201 that only every fourth measurement will be during a PRS subframe, albeit during all PRS subframes while the measurement restriction is in effect. It will, however, be clear to those skilled in the art, after reading this specification, how to configure base station 202 to instead impose a narrower restriction, in that wireless terminal 201 measures one or more cell-specific reference signals only during the designated time intervals.

In the prior art, the measurement restriction capability has been applied to supporting femtocells that are deployed in an area where an LTE-based cellular system provides macrocellular service in the same spectrum. To avoid disruption of the macrocellular system, the femtocells are directed to transmit minimal amounts of radio signal in certain designated time intervals known as "almost blank subframes" (ABS). The macrocellular system directs wireless terminals to attempt to detect cell-specific reference Signals only in the ABS time intervals. The advantage of doing so is that, during ABS intervals, interference from femtocells is minimized. In contrast, and in accordance with the illustrative embodiment, telecommunications system 200, specifically base station 202, directs wireless terminal 201 to detect the cell-specific reference signals only in the positioning subframe time intervals. In some alternative embodiments, however, system 200 might direct terminal 201 to detect the cell-specific reference signals in additional time intervals (e.g. in at least some ABS time intervals, etc.).

Base station 202 transmits measurement restriction 505 over a broadcast channel (BCH), in well-known fashion, wherein the measurement restriction is in the form of a mask. In some embodiments, station 202 transmits the measurement restriction to terminal 201 in some other signaling message. In some other embodiments, station 202 transmits the measurement restriction based on a location estimation process, such as the one described above and with respect to FIG. 6.

In some embodiments, the transmitting of measurement restriction 505 is based on a predetermined characteristic of wireless terminal 201. In some other embodiments, the transmitting of the measurement restriction is based on the location of the wireless terminal or on an estimate of said location. In still some other embodiments, the transmitting of the measurement restriction is based on a measured level of interference (e.g., measured by one or more wireless terminals, measured by one or more base stations, etc.).

In accordance with process 802, base station 202 transmits measurement directive 507 to wireless terminal 201. Directive 507, in some embodiments, identifies specific signal sources to measure.

In some embodiments, the transmitting of measurement directive 507 is based on a predetermined characteristic of wireless terminal 201. In some other embodiments, the transmitting of the measurement directive is based on the location of the wireless terminal or on an estimate of said location. In still some other embodiments, the transmitting of the measurement directive is based on a measured level of interference (e.g. measured by one or more wireless terminals, measured by one or more base stations, etc.).

In response to receiving directive 507, wireless terminal 201 performs measurements on one or more cell-specific reference signals and provides one or more measurement results (e.g., result 508, etc.) back to base station 202. The wireless terminal might perform the measurements using the same techniques that it would normally use to perform those measurements.

In some alternative embodiments, wireless terminal 201 might perform the measurements using techniques that take advantage of the specific characteristics of the positioning reference signals to further improve and enhance the quality of the measurements. For example, the positioning reference signals might exhibit mutual orthogonality, which is a desirable characteristic in signals that are optimized for OTDOA. It is well known in the art how to take advantage of orthogonality to reduce interference caused by orthogonal signals.

In accordance with process 803, base station 202 receives measurement result 508 from wireless terminal 201. In response, station 202 forwards the result to location server 214 via message 509.

In accordance with process 504, base station 202 is capable of repeating some or all of processes 801 through 803, either in response to one or more messages received from location server 214 and/or wireless terminal 201, or autonomously, or both.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    transmitting, by a base station, a measurement directive to a wireless terminal to measure one or more reference signals, wherein a measurement restriction transmitted to the wireless terminal indicates designated time intervals of one or more positioning subframes in which positioning reference signals are transmitted by one or more base stations, and wherein the measurement restriction imposes a restriction on the wireless terminal to measure the one or more reference signals coincident with the designated time intervals;
    receiving, by the base station, a measurement result from the wireless terminal in response to the measurement directive being transmitted; and
    generating, by a location server, an estimate of the location of the wireless terminal, based on the measurement result;
    wherein the estimate is obtained without using observed time difference of arrival (OTDOA) measurements.

2. The method of claim 1 wherein the estimate is obtained using a pattern-matching technique.

3. The method of claim 1 wherein the estimate is obtained using enhanced cell identifier (ECID) positioning.

4. The method of claim 1 wherein the transmitting of the measurement directive is based on a predetermined characteristic of the wireless terminal.

5. The method of claim 1 wherein the transmitting of the measurement directive is based on an estimate of the location of the wireless terminal.

6. A method comprising:
    transmitting, by telecommunications system to a wireless terminal, a measurement restriction that indicates designated time intervals, wherein the measurement restriction imposes a restriction on the wireless terminal to measure one or more cell-specific reference signals coincident with the designated time intervals;
    transmitting, by the telecommunications system, a measurement directive to the wireless terminal to measure the one or more cell-specific reference signals;
    receiving a measurement result from the wireless terminal of the one or more cell-specific reference signals, wherein the measurement result is received in response to the measurement directive being transmitted; and
    generating, by a location server, a first estimate of the location of the wireless terminal, based on the measurement result.

7. The method of claim 6 wherein the designated time intervals are of one or more positioning subframes in which one or more positioning reference signals are transmitted by one or more base stations.

8. The method of claim 6 wherein the designated time intervals are based on when one or more almost blank subframes are transmitted by a neighbor cell.

9. The method of claim 8 wherein the neighbor cell is a femtocell.

10. The method of claim 6 wherein the transmitting of the measurement restriction is based on the location estimation process that is used for generating the first estimate.

11. The method of claim 10 wherein the first estimate is further based on the location estimation process.

12. The method of claim 6 wherein the first estimate is obtained using a pattern-matching technique.

13. The method of claim 6 wherein the first estimate is obtained using enhanced cell identifier (ECID) positioning.

14. The method of claim 6 wherein the transmitting of the measurement restriction is based on a predetermined characteristic of the wireless terminal.

15. The method of claim 6 wherein the transmitting of the measurement restriction is based on a prior estimate of the location of the wireless terminal.

16. The method of claim 6 wherein the transmitting of the measurement restriction is based on a measured level of interference.

17. A method comprising:
    transmitting, by telecommunications system to a wireless terminal, a measurement restriction that indicates designated time intervals, wherein the measurement restriction imposes a restriction on the wireless terminal to measure one or more cell-specific reference signals coincident with the designated time intervals, and wherein the transmitting of the measurement restriction is based on a location estimation process that is used to generate an estimate of the location of the wireless terminal;
    receiving a measurement result from the wireless terminal of the one or more cell-specific reference signals; and
    generating, by a location server, the estimate of the location of the wireless terminal, wherein the estimate is based on the measurement result.

18. The method of claim 17 wherein the estimate is obtained using a pattern-matching technique.

19. The method of claim 17 further comprising transmitting a measurement directive to the wireless terminal to measure the one or more cell-specific reference signals, wherein the transmitting of the measurement directive is based on the location estimation process, and wherein the measurement result is received in response to the measurement directive being transmitted.

20. The method of claim 19 wherein the transmitting of the measurement directive is also based on a prior location estimate of the wireless terminal.

\* \* \* \* \*